UNITED STATES PATENT OFFICE.

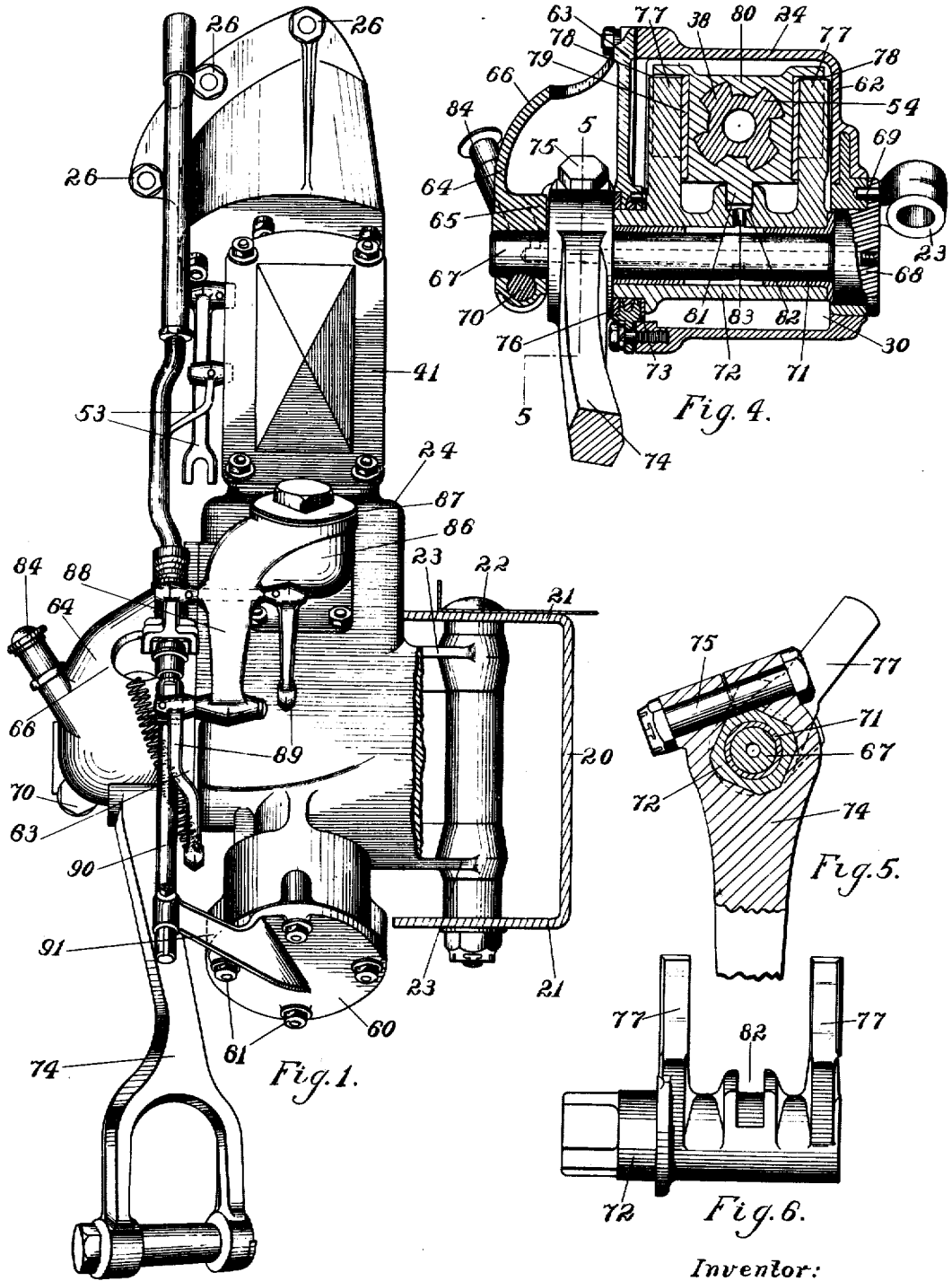

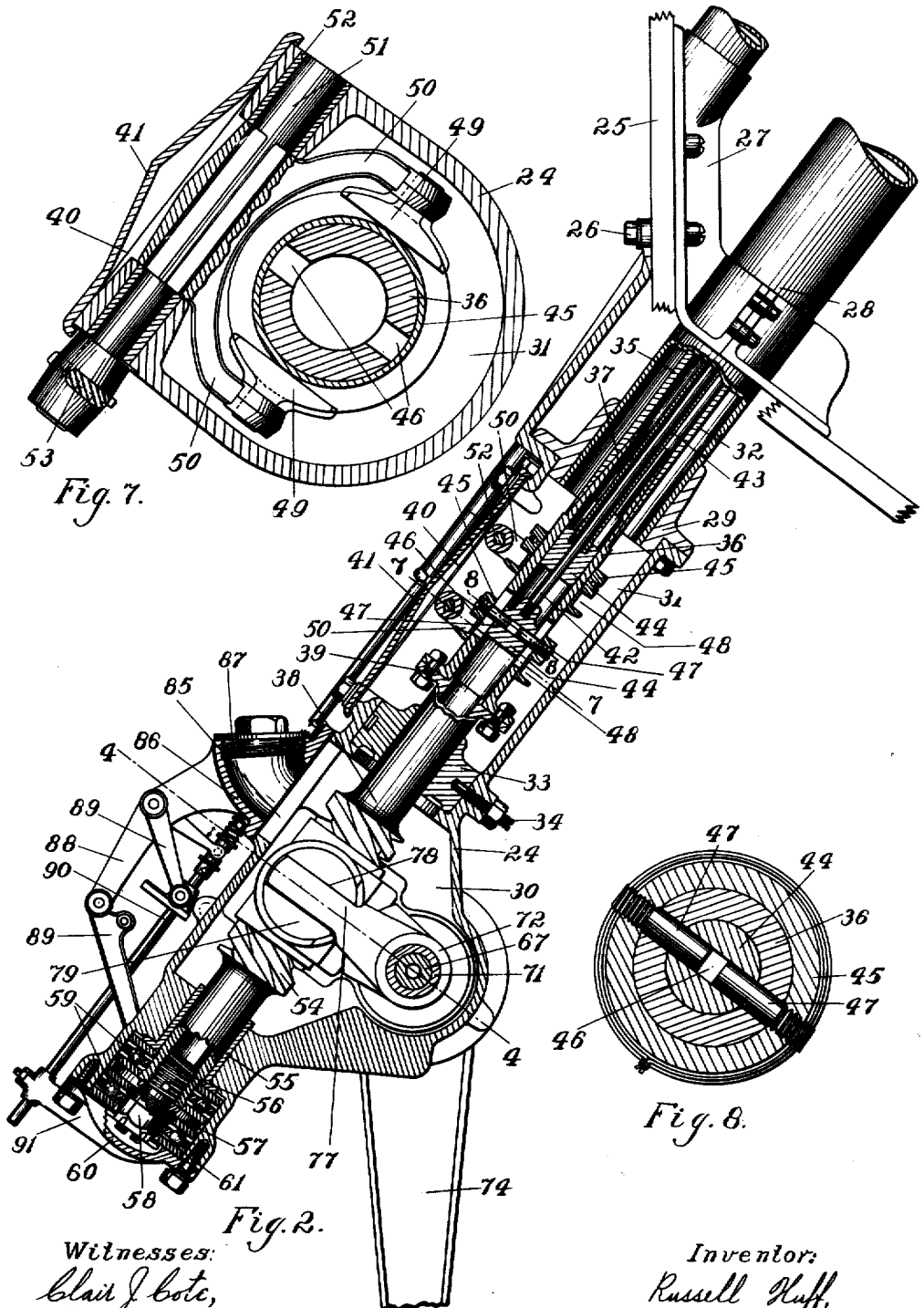

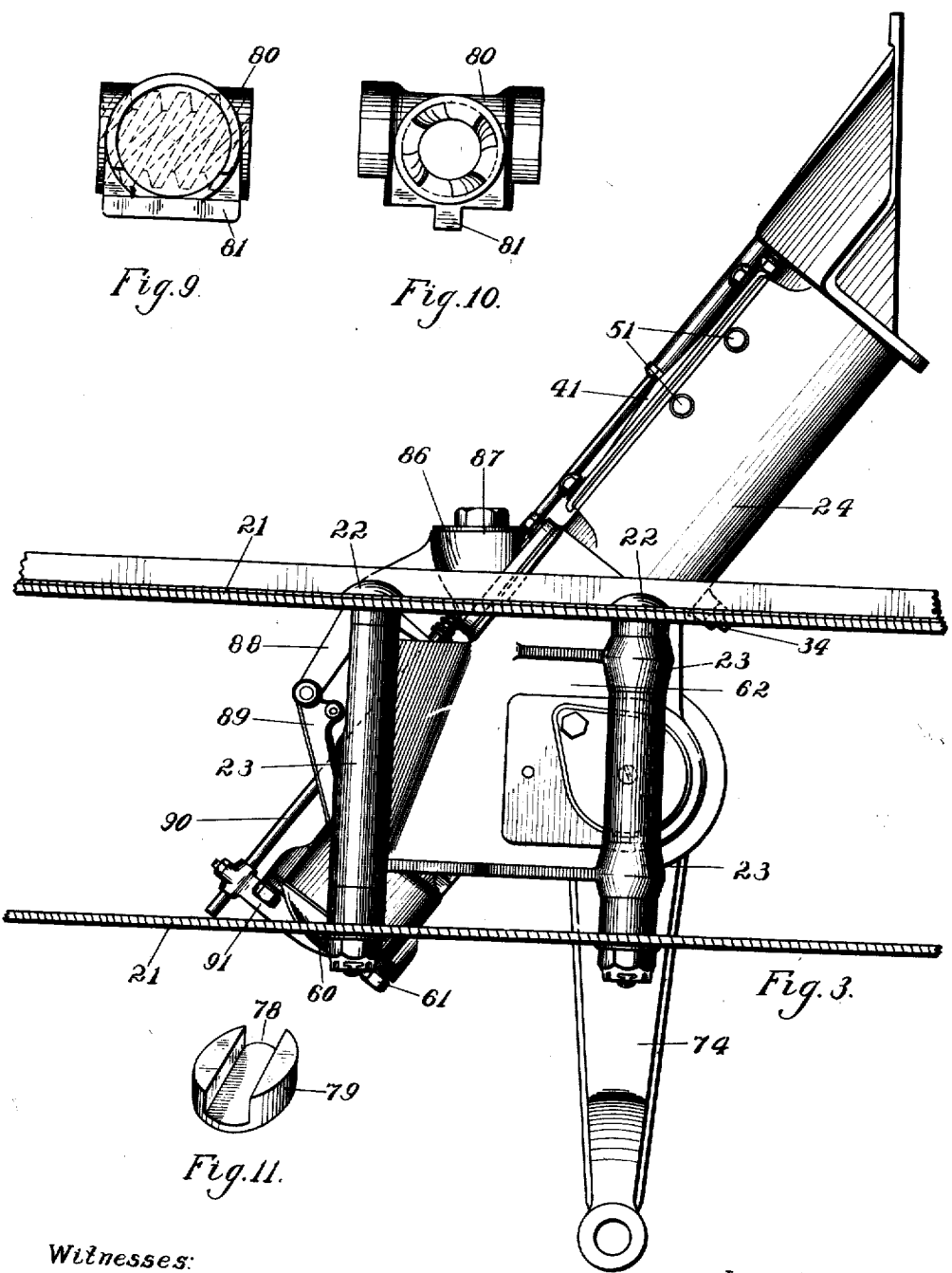

RUSSELL HUFF, OF DETROIT, MICHIGAN, ASSIGNOR TO PACKARD MOTOR CAR COMPANY, OF DETROIT, MICHIGAN, A CORPORATION OF MICHIGAN.

CONTROL MECHANISM FOR MOTOR-VEHICLES.

1,280,738.      Specification of Letters Patent.      Patented Oct. 8, 1918.

Application filed August 22, 1913. Serial No. 786,192.

*To all whom it may concern:*

Be it known that I, RUSSELL HUFF, a citizen of the United States, and resident of Detroit, Wayne county, State of Michigan, have invented certain new and useful Improvements in Control Mechanism for Motor-Vehicles, of which the following is a specification.

This invention relates to motor vehicles, and particularly to the steering gear and motor control devices thereof.

One of the objects of the present invention is to provide a steering gear casing having two compartments separated by a removable partition, which partition may form a bearing for the steering shaft which is shown as passing through both of the compartments.

Another object of the invention is to provide a steering gear casing having upper and lower compartments with motor control devices in the upper compartments and steering gear connections in the lower compartment. The steering shaft is shown as passing through both compartments and as having a bearing in the partition between the compartments, and another bearing in the lower end of the casing.

Another object of the invention is to provide a two-compartment steering gear casing of the type described in the preceding paragraph with a closing cap over the opening in the lower end of the lower compartment and covering the end of the steering shaft and its lower bearing. By this arrangement the lubricant is retained in the lower compartment and particularly in the lower bearing, which, in the present instance, is a thrust bearing for taking the entire thrust in both directions on the steering shaft. This arrangement is possible only by reason of the fact that the motor control devices which pass through the upper section of the steering shaft terminate in the upper compartment of the casing and are provided with suitable connections passing outwardly through the walls of said compartment.

Another object of the invention is to provide a steering gear for motor vehicles in which the casing forms a support for the operating shaft through a pin which is supported at one end in one wall of the casing and at the other end in a supporting arm which is arranged outside of and separated from the casing. This arrangement provides a long bearing for the operating shaft on the pin and the entire shaft and the steering arm connected to it are arranged between the supports for the pin. Thus there is no overhang of the steering arm or operating shaft, and wear is reduced to a minimum.

Another object of the invention is to provide a simple and efficient operating connection between the steering shaft and the operating shaft for the steering arm together with simple means for lubricating the various bearing surfaces.

Another object of the invention is to provide a steering shaft formed with several parts or sections, each of which may be of different cross sectional area from the others and which sections are suitably joined together to make a continuous shaft. As shown, the upper and intermediate sections are joined by brazing, thus making practically a permanent joint, while the lower section is joined to the intermediate section by a detachable flange joint.

Other objects of the invention will appear from the following description, taken in connection with the drawings which form a part of this specification, and in which—

Figure 1 is a front view of a steering gear embodying this invention and shown supported on one of the side members of the frame of a motor vehicle, which side member is shown in transverse section in this view;

Fig. 2 is a longitudinal section through the steering gear shown in Fig. 1;

Fig. 3 is a left side elevation of the steering gear shown in Fig. 1 with the web portion of the vehicle frame cut away to disclose the steering gear casing;

Fig. 4 is a section substantially on the line 4—4 of Fig. 2;

Fig. 5 is a section substantially on the line 5—5 of Fig. 4;

Fig. 6 is a detail view of the operating shaft;

Fig. 7 is an enlarged transverse section substantially on the line 7—7 of Fig. 2;

Fig. 8 is an enlarged section on the line 8—8 of Fig. 2; and

Figs. 9, 10 and 11 are detail views.

Referring to the drawings, 20 represents one of the channel section side bars of a motor vehicle frame, and between the flanges 21 of this side bar are secured, as by bolts 22, the arms 23 of the steering gear casing 24. Thus the casing is supported principally upon the frame of the vehicle, but it is shown in Fig. 2 as being connected also at its upper end to the vehicle dash 25, as by the bolts 26. Also a bracket 27 is secured on the opposite side of the dash 25 and supports the steering post or tube 28 which is secured, as by a flange 29, to the upper end of the casing 24.

Upon reference particularly to Fig. 2, it will be seen that the casing 24 is divided into two compartments, the lower compartment 30 forming a housing for the steering gear including the worm and nut thereof, and the upper compartment 31 forming a housing for the motor control devices, which will be hereinafter described, and for the steering shaft which passes through it. It will be seen that the steering column or tube 28, by its connection at the upper end of the casing 24, forms a continuation of the upper compartment 31 and houses the upper end of the tubular steering shaft 32.

The compartments 30 and 31 are separated by a partition, which is shown in the form of a two-part removable bearing member 33 secured in place by a bolt 34 extending to the outside of the casing. The steering shaft 32 is shown as originally formed of three distinct parts, the upper part 35, which is a comparatively thin tube; the intermediate part 36, which is of heavier tubular formation and is preferably brazed or otherwise substantially secured to the part 35, as shown at 37; and the lower or worm part 38, which has a detachable flange joint 39 with the lower end of the intermediate part. It will be seen that this detachable joint 39 is located in the upper compartment 31, and by means of this joint the two upper connected sections of the steering shaft may be removed without in any way disturbing the lower section 38 of the shaft, the joint and other parts contained in the compartment 31 being accessible through an opening 40 in the front of the compartment, which opening is closed by a removable cover 41.

Motor control devices in the form of rods and connections are arranged within the compartment 31 and the upper sections of the steering shaft, thus rods 42 and 43 are shown concentrically arranged within the steering shaft and each rod is connected at its lower end to a block 44, and sleeves 45 sliding on the outside of the steering shaft are connected through slots 46 to the respective blocks by means of transversely arranged pins 47. This latter construction is shown in detail and enlarged in Fig. 8. The purpose of making the intermediate section 36 of the steering shaft of heavier material than the upper section 35 is apparent since all four of the slots 46 are formed in this intermediate section. These slots, of course, weaken the tubular shaft to some extent, but by reason of the fact that the intermediate section is heavier than the upper section, sufficient strength is obtained without making the long upper section of heavy stock.

Each of the sleeves 45 is formed with an annular groove 48 in which travel the pivot shoes 49 of yokes 50, which are keyed to shafts 51 mounted in suitable bearings 52 in the casing and extending through the walls thereof, as shown particularly in Fig. 7. Upon the projecting ends of the shafts 51 are mounted suitable lever arms 53 which may be connected as desired with the various parts of the motor to be controlled, such as the throttle and ignition timing devices.

The central part of the lower section 38 of the steering shaft is formed with a worm gear 54, its upper end is rotatably mounted in the bearing member 33, and its lower end is rotatably mounted in a bearing 55. This section of the shaft is also preferably tubular in formation like the other sections of the steering shaft, and its lower end is interiorly threaded and fitted with a plug 56 which projects slightly beyond the end of the shaft and is surrounded by a disk 57 which is secured to the end of the shaft by means of a nut 58 screwed onto the end of the plug 56. In this position the disk 57 is adapted to resist the end thrusts of the steering shafts in both directions through ball thrust bearings 59 arranged above and below the disk, the upper bearing resting against a shoulder formed in the casing and the lower bearing retained by a removable cover 60 which is secured to the casing, as by bolts 61, and which thereby closes the lower end of the casing, covering the end of the shaft and the bearings.

By referring particularly to Figs. 1 and 4, it will be seen that the compartment 30 of the casing has two opposite walls 62 and 63, the latter of which is in the form of a removable cover having a member 64 extending outwardly therefrom in the form of a support or boss 65 and an integral web 66. The wall 62 and the boss 65 form supports for the ends of a pin 67, the head 68 of which pin being prevented from rotating in the casing by means of a stud 69, and the other end of the pin being secured in the boss, as by a transverse bolt 70.

Adjacent the ends of the pin 67 are bushings 71, upon which is mounted a hollow operating shaft 72. This shaft projects through an opening 73 in the wall or cover 63 and has its projecting end of squared cross section, as shown particularly in Figs. 5 and 6, to receive the similar internally squared end of the steering arm 74. This arm is securely clamped to the operating shaft by means of a clamping bolt 75. A packing gland 76 surrounds the operating shaft 72 where it passes through the cover 63, to prevent the escape of lubricant at that point.

The operating shaft 72 is formed with one, or preferably two, radially extending integral arms 77 which have a sliding fit in ways 78 formed in cylindrical pieces 79 arranged in the ends of a block or nut 80 which surrounds the threaded or worm portion of the steering shaft. The plug 80 is formed with an integral lug 81 which extends into a slot 82 formed in the adjacent portion of the operating shaft 72, thus preventing the rotation of the plug 80 with the steering shaft. While it is intended that the compartment 30 shall be packed with grease for lubricating the working parts therein, the lubrication of the bearing 71 and the sliding connection between the lug 81 and the groove 82 is further insured by drilling the pin 67, as shown in dotted lines in Fig. 4 and in full lines in some of the other figures, and providing a transverse channel 83 in the shaft 72 connecting the interior of said shaft with the groove 82. An oil cup 84 supplies lubricant to the interior of the pin 67, and it is from there conveyed to the bearings 71 and to the groove 82.

From the above description it will be observed that the rotation of the steering shaft 32, by means of a suitable hand wheel mounted at the top of the steering column 28 and not shown in the drawings, causes, through the threads of the shaft section 38 and the plug 80, a longitudinal movement of the plug on the shaft 32. The plug 80 carries with it the cylindrical pieces 79 which oscillate slightly in the ends of the plug and carry with them the arms 77 which thereupon rock the operating shaft 72. The operating shaft 72, being keyed to the steering arm 74, the latter is oscillated and, through its connection with the front steering wheels of the vehicle, (which connections are not shown in the drawings) moves the wheels to one side or the other as desired.

An opening 85 is provided in the upper part of the compartment 30 and closed by a cover 86 having a removable screw cap 87 to permit of filling the compartment with grease or other lubricant. The cover 86 has an integral arm 88 extending outwardly and downwardly therefrom for supporting bell crank levers 89 operated by a rod 90, which rod is under the control of the operator. The lower end of the rod is shown as having a sliding bearing in an arm 91 extending transversely from the cover 60 at the lower end of the casing. By means of this construction, that is, the casting of these arms 88 and 91 integrally with the small cover pieces, should either of these arms break, the cost of replacing the broken part is considerably less than it would be if the arms were formed integrally with the casing, as is the usual practice.

A specific embodiment of the invention has been described in detail and will be specifically claimed, but it will be understood that the invention is not limited to the exact details of construction shown, as it will be apparent that changes may be made without departing from the spirit or scope of the invention.

Having thus described my invention, what I claim and desire to secure by Letters Patent is:

1. A steering gear casing for motor vehicles comprising upper and lower compartments, a two part steering shaft extending through both compartments having a worm in the lower compartment and a joint between its parts in the upper compartment, and a partition between the compartments forming a bearing for the shaft intermediate the worm and the joint, said partition being detachable from the casing endwise of the shaft.

2. In a steering gear for motor vehicles, the combination of a casing having upper and lower compartments, and a two part steering shaft extending through both compartments and having the worm on said shaft in the lower compartment and a joint between its parts in the upper compartment.

3. In a steering gear for motor vehicles, the combination of a casing having upper and lower compartments, a steering shaft extending through both said compartments, motor control devices in said steering shaft, connections from said devices through the walls of the upper compartment, and steering connections from said steering shaft through the walls of said lower compartment.

4. In a steering gear for motor vehicles, the combination of a casing having upper and lower compartments, a tube secured to the upper end of the casing and forming a continuation of the upper compartment, a steering shaft extending through the tube and through both compartments and having a joint in the upper compartment and a worm in the lower compartment, and an operating shaft pivoted in the lower compartment of the casing and adapted to be operated by said worm.

5. In a steering gear for motor vehicles, the combination of a casing having upper and lower compartments, and a bearing member separating said compartments, a steering shaft extending through said casing and having bearings in said member and in the lower end of the casing, motor control devices extending partly through said shaft and terminating in the upper compartment of the casing, connections from said devices through the walls of the upper compartment, and a closing cap over the lower end of the casing covering the end of the steering shaft and its bearing.

6. In a steering gear for motor vehicles, the combination with a support, of a steering arm, a hollow operating shaft for said arm, a pin passing through said shaft and having bearings therefor, said pin being connected to said support beyond both ends of said shaft, and means for operating said shaft.

7. In a steering gear for motor vehicles, the combination with a support, of a steering arm, a hollow operating shaft for said arm, a pin passing through said shaft and having bearings therefor, said pin being keyed to said support beyond both ends of said shaft, and means for operating said shaft.

8. In a steering gear for motor vehicles, the combination with a support having separated supporting members, and a pin supported in said members, of bearings on said pin between said members, an operating shaft mounted on said bearings, a steering arm secured to said operating shaft, and means for operating said shaft.

9. In a steering gear for motor vehicles, the combination with a casing comprising separated walls having alined openings and a supporting member beyond one of said walls in line with said openings, of a pin extending through said openings and having its ends secured in one of said walls and in said member, bearings on said pin, a steering arm mounted on said bearings and means for operating said shaft.

10. In a steering gear for motor vehicles, the combination with a casing comprising separated walls having alined openings and a supporting member beyond one of said walls in line with said openings, of a pin extending through said openings and having its ends secured in one of said walls and in said member, a steering arm and operating shaft therefor mounted in bearings on said pin, and means for operating said shaft.

11. In a steering gear for motor vehicles, the combination with a casing comprising separated walls having alined openings and a supporting member beyond one of said walls in line with said openings, of a pin extending through said openings and having its ends secured in one of said walls and in said member, a steering arm mounted between one of said openings and the wall of said member on bearings on said pin, an operating shaft for said steering arm mounted between said openings on bearings on said pin, and means for operating said shaft.

12. In a steering gear for motor vehicles, the combination with a casing having one side open, and a removable cover for said open side, said cover having an integral extension forming a support separated from the outer face of the cover, of a pin mounted in said support and in said casing and passing through said cover, a steering arm mounted on said pin between said support and said cover, and means for operating said arm.

13. In a steering gear for motor vehicles, the combination with a casing having separated walls, one of said walls forming a support, and a second support arranged outside of and separated from the opposite wall, of a pin mounted in said supports and extending through said opposite wall, an operating shaft mounted on bearings on said pin between said supports and extending through said opposite wall, a steering arm secured to said operating shaft between said opposite wall and said outside support, and means for operating said shaft.

14. In a steering gear for motor vehicles, the combination with a support, of a steering arm, a hollow operating shaft for said arm, said shaft having integral operating arms, a pin connected at its ends to said support and passing through said hollow shaft, said hollow shaft being adapted to turn relative to said pin, and means for operating said shaft through said operating arms.

15. In a steering gear for motor vehicles, the combination of a support, a steering arm and an operating shaft for said arm pivotally mounted on said support, arms on said shaft for turning it, a steering shaft mounted in bearings on said support at right angles to said operating shaft and extending between the arms thereon, thrust bearings to prevent longitudinal movement of said steering shaft, a block having threaded engagement with said steering shaft, and means comprising pieces for forming a sliding pivotal connection between said block and arms, whereby the rotation of the steering shaft oscillates the operating shaft.

16. In a steering gear for motor vehicles, the combination of a support, a steering arm and an operating shaft for said arm pivotally mounted on said support, arms on said shaft for turning it, a steering shaft mounted in bearings on said support at right angles to said operating shaft and extending between the arms thereon, thrust bearings to prevent longitudinal movement of said steering shaft, a block having threaded engagement with said steering shaft, and means comprising cylindrical pieces in said block for forming a sliding pivotal connection between said block and arms, whereby the rotation of the steering shaft oscillates the operating shaft.

17. In a steering gear for motor vehicles, the combination of a casing, an operating shaft pivotally mounted therein, said shaft having a radial arm for operating it, a steering shaft mounted in bearings in said casing, a block having threaded engagement with said steering shaft and connected to said arm, and means independent of said arm between the block and said operating shaft to prevent rotation of the block with the steering shaft.

18. In a steering gear for motor vehicles, the combination of a casing, an operating shaft pivotally mounted therein, said shaft having a radial arm for operating it, a steering shaft mounted in bearings in said casing, a block having threaded engagement with said steering shaft and connected to said arm, a lug on said block, and a segmental groove for said lug in said operating shaft, whereby rotation of the block with the steering shaft is prevented.

19. In a steering gear for motor vehicles, the combination of a casing, an operating shaft having bearings within the casing, a steering shaft also mounted in bearings in the casing, a block having threaded engagement with said steering shaft and connected to oscillate said operating shaft, a lug and groove connection between said block and operating shaft to prevent rotation of the block with the steering shaft, and means for feeding lubricant to the bearings of said operating shaft and from there to said lug and groove connection.

20. In a steering gear for motor vehicles, the combination of a casing and a steering shaft therein, said shaft being formed of three parts, two of said parts being substantially permanently secured together and the third part being secured to one of the other parts by a detachable joint.

21. In a steering gear for motor vehicles, the combination of a casing and a steering shaft therein, said shaft being formed of three parts, each of different cross sectional area, two of said parts being substantially permanently secured together and the third part being secured to one of the other parts by a detachable joint.

22. In a steering gear for motor vehicles, the combination of a support, a steering arm and an operating shaft for said arm pivotally mounted on said support, arms on said shaft for turning it, a steering shaft mounted in bearings on said support at right angles to said operating shaft, thrust bearings to prevent longitudinal movement of said steering shaft, a worm arranged on said steering shaft between said arms, a threaded block surrounding said worm, and means comprising pieces for forming a pivotal connection between said block and arms whereby the rotation of the steering shaft oscillates the operating shaft.

23. In a steering gear for motor vehicles, the combination of a support, a steering arm and an operating shaft for said arm pivotally mounted on said support, arms on said shaft for turning it, a steering shaft mounted in bearings on said support at right angles to said operating shaft, thrust bearings to prevent longitudinal movement of said steering shaft, a worm arranged on said steering shaft between said arms, a threaded block surrounding said worm, and means comprising cylindrical pieces for forming a sliding pivotal connection between said block and arms whereby the rotation of the steering shaft oscillates the operating shaft.

24. In combination, a casing, a sliding actuating member therein, means for operating said member, a shaft provided with crank fingers entering circular recesses in opposite sides of said actuating member in axial parallelism with said shaft, and parti-cylindric members in said recesses at opposite sides of said fingers, whereby when the actuating member is operated the shaft is rocked.

25. In combination, a casing, a slidable actuating member therein provided with cylindric recesses in its opposite sides in axial parallelism with the rocker shaft, a screw for reciprocating said actuating member, a rocker shaft beside said actuating member provided with crank fingers entering said recesses, and parti-cylindric blocks in the recesses engaging said crank fingers, whereby the angular motion of said crank fingers relative to the actuating member is compensated for.

26. In combination, a casing, a reciprocating actuating member therein provided with parti-cylindric recesses in its opposite sides in axial parallelism with the rocker shaft, a worm shaft for moving said member longitudinally, a rocker shaft having crank fingers entering said recesses, and parti-cylindric blocks placed in said recesses on opposite sides of said crank fingers, whereby when the actuating member is moved longitudinally said shaft is rocked and the angular motion of the crank fingers relative to said actuating member is automatically compensated for.

27. In combination, a casing, a slidable actuating member therein provided with cylindric recesses in its opposite sides in axial parallelism with the rocker shaft, means for reciprocating said actuating member, a rocker shaft beside said actuating member provided with crank fingers entering said recesses, and rotatable disks in the recesses having opposite parti-cylindric segments engaging said crank fingers, whereby the angular motion of said crank fingers relative to the actuating member is compensated for.

28. In combination, a casing, a reciprocating actuating member therein provided with parti-cylindric recesses in its opposite sides in axial parallelism with the rocker shaft, means for moving said member longitudinally, a rocker shaft having crank fingers entering said recesses, and rotatable disks pivotally mounted in said recesses and having parti-cylindric segments on opposite sides of and engaging said crank fingers, whereby when the actuating member is moved longitudinally said shaft is rocked and the angular motion of the crank fingers relative to said actuating member is automatically compensated for.

29. In combination, a reciprocatory member having a cylindric recess in its outer side axially parallel with the axis of the rocking member, a rocking member having a crank finger extending beside said reciprocatory member and entering said recess, and parti-cylindric segments in said recess filling the spaces between the sides of said crank finger and the outer walls of said recess, substantially as described.

30. In combination, an actuating member having an open ended cylindric recess in its side, means for producing longitudinal motion of said member, a rocker member entering said recess in the actuating member, and parti-cylindric segments in said recess at opposite sides of said rocker member, said segments being rotatable within said recess and slidable relative to said rocker member.

31. In combination, an actuating member having a cylindric recess in its outer side, a rotatable disk provided with parti-cylindric segments on its outer face inserted in said recess, and a rocker lever pivoted at one side of said actuating member and extending into said recess and between the parti-cylindric segments therein, whereby slippage due to angular motion is overcome.

32. In combination, an actuating member having a cylindric recess on each side in axial alinement, parti-cylindric segments in said recesses, and a pair of rocking levers respectively entering one of said recesses and lying between the opposite segments therein, substantially as described.

33. In combination, a casing, a reciprocating actuating member therein provided with cylindric recesses in axial alinement, means for moving said member longitudinally, pivoted members entering said recesses, and parti-cylindric members in said recesses at opposite sides of said pivoted members, whereby when the actuating member is moved longitudinally said pivoted members are rocked.

34. In combination, a casing, a sliding actuating member therein, having open ended circular recesses in its opposite sides, means for operating said member, and a shaft provided with crank fingers entering the circular recesses in said actuating member, and a rotatable disk in said recess provided with parti-cylindric members at opposite sides of the finger therein, whereby when the actuating member is operated the shaft is rocked, substantially as described.

In testimony whereof I affix my signature in the presence of two witnesses.

RUSSELL HUFF.

Witnesses:
H. B. KNAP,
LE ROI J. WILLIAMS.

It is hereby certified that in Letters Patent No. 1,280,738, granted October 8, 1918, upon the application of Russell Huff, of Detroit, Michigan, for an improvement in "Control Mechanism for Motor-Vehicles," an error appears in the printed specification requiring correction as follows: Page 4, line 38, claim 9, for the word "shaft" read *arm;* and that the said Letters Patent should be read with this correction therein that the same may conform to the record of the case in the Patent Office.

Signed and sealed this 26th day of November, A. D., 1918.

[SEAL.]

R. F. WHITEHEAD,

*Acting Commissioner of Patents.*

Cl. 74—39.